Aug. 19, 1930.  A. AMES, JR., ET AL  1,773,335
IMAGE MODIFIER
Filed June 21, 1922
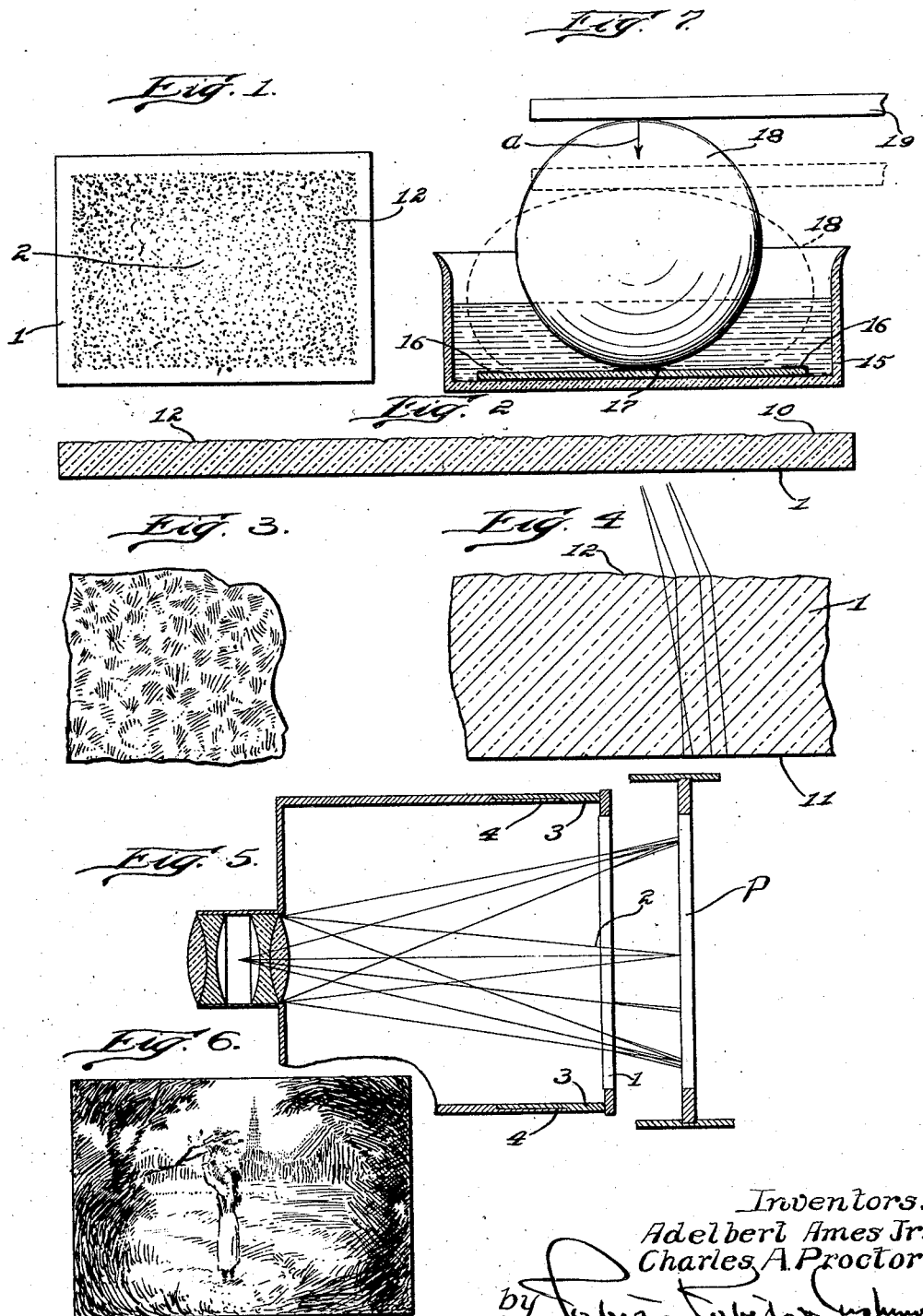

Patented Aug. 19, 1930

1,773,335

UNITED STATES PATENT OFFICE

ADELBERT AMES, JR., AND CHARLES A. PROCTOR, OF HANOVER, NEW HAMPSHIRE

IMAGE MODIFIER

Application filed June 21, 1922. Serial No. 569,992.

This invention relates to an image modifier adapted to change the character of the image formed by an objective lens, and useful for the purpose of altering the characteristics of such an image, and to the art of making such image modifiers.

In photography it may be desired to alter the character of the image in a primary sense, when the images are of the natural objects, and the altered image is to be impressed upon a plate to form a photographic picture; or in photography it may be desired to alter the characteristics of the previous negative or positive photograph by making a copy, and in that case the image modified is a secondary image; or it may be desired to project a positive picture upon a screen for visual purposes, and in that case the modification of the image would be tertiary, and in respect to the ultimate thing to be viewed by the observer of the picture, i. e., the screen image.

The character of change or modification in the image whether primary, secondary, or tertiary, and for which the device of this invention is particularly adapted, is to produce an approximation of the image characteristic of the normal ocular retinal impression. While we have described in detail the characteristics of these visual impressions elsewhere, it will suffice for the present purposes to mention that the visual acuity of the peripheral parts of the retina is not as good as it is at the fovea centralis or clear-seeing area upon which the objects at which we are looking directly, and which have our mental attention, are imaged. At an angle of 20° away from this center of attention visual acuity is much reduced; it approximates the average to say that at the fovea centralis the definition is about forty times better than it is 20° away from the axis. The blurring and lack of acuity of vision away from the axis may be assigned to two causes; first to the oblique aberrations of the lens-system of the eye; and second, to the lack of sensitiveness or physiological resolving power of the retinal surface itself in its outlying portions. Anatomically, the cones of the rod-and-cone nervous system of the retina are spaced much further apart in the outlying parts of the retina than they are at the clear-seeing part.

We have by research determined the optical losses of the lens system of the eye with respect to sharpness and the physiological losses in respect to lack of retinal sensitiveness at the outlying portions of the retina, and conclude that at 20° from the axis the lack of definition, as measured by the error of sharpness of the test object, should be about forty times that at and near the axis.

For practical approximative purposes the clear-seeing area of vision may be considered to be about 6° wide horizontally and about 4° high vertically at the maximum, and beyond this area the definition losses gradually increase about in proportion to the angle of departure from the axis.

For the various purposes above mentioned, i. e., for photography or the display of photographs, the existing practices are not fortunate in several respects. Until recently, the attempt of photographers was to produce, with the aid of elaborately corrected lenses, worked under small aperture, and with plates capable of discrimination of fine detail, a picture of which every part was defined to the limit of accuracy of the optical and photographic materials at hand. In a picture of a building, for example such architectural details as every brick and every nail head could be counted; in a picture of a tree the leaves and the bark were presented in such specific delineation as to produce a faithful record of everything except the actual appearance of the tree to the eye. Recently a better consideration of the aesthetics of portrait and landscape photography, especially as induced by the great increase in the use of photography for motion picture purposes, has led even the average photographer to see that what may be referred to as the broad and whole visual content of any picture is not to be reached by a photograph in detail of every part of the field of view. The remedies heretofore offered have comprised numerous schemes for blurring the image of the photographic lens, for example by the so-called "soft focus" lenses such as Dallmeyer's classic contribution along this line, and a number of secondary devices such as printing the images with the negative and the print out of contact, not to mention the familiar expedients for vignetting either the primary image, or the print, or the positive, for the purpose of obtaining a certain approximate concentration upon the interesting part of the picture to which attention was to be directed. Motion picture photographers, for instance, have in common practice used dark colored screens of chiffon, with a hole in the center in front of the taking lens, and there have been other expedients of this nature, without wholly satisfactory results. This is because in pictures made by any of these expedients, the picture is defective either in that the loss of detail does not gradually fall off from the center outward, or that the loss of detail does not fall off to the same extent and in the same way that it does in the eye; or that the diffusing means obstructs the light or breaks it up to such an extent that a large part of it does not reach the plate, with the result that there is under-exposure at the outer parts of the plate or over-exposure at the center of attention. It will be obvious that, although the definition should decrease away from the center of attention, the monochromatic values (and the color in the case of the color photographs) should be correctly pictured if the photograph is to be satisfactory.

Objects of the present invention are to provide a way of producing approximately the effect of the normal visual impression by simple means adapted to be used with the ordinary camera, enlarger, printer, copying camera, or projection apparatus, for the purpose of either primarily, secondarily, or finally producing from an image otherwise too exact in its outlying parts an image exact at the center of attention, and diffused quantitatively to the correct extent to correspond to visual impression at outlying parts of the picture.

We shall now describe with the aid of the accompanying drawings one example only of an image modifier corresponding to the invention, by way of illustration of the genus which it exemplifies, and the best mode known to us of preparing this instrument. In the drawings, Fig. 1 is a face view indicating the principal features of an image modifying screen corresponding to the invention:

Fig. 2 is a typical section on an exaggerated vertical scale through the center of the screen shown in Fig. 1;

Fig. 3 is a very much enlarged elevation of a detail of the surface toward the margins of the screen, showing the appearance of the screen against a bright background;

Fig. 4 is an enlarged section corresponding to the part of Fig. 3 showing the nature of the surface irregularities;

Fig. 5 is a diagram illustrating a preferred relation of the image forming lens, the screen, and the photograph;

Fig. 6 is a diagram which will serve to indicate, but not to show, the qualities of the modified image, and Fig. 7 is a side elevation, the screen being shown in vertical section, illustrating steps in the preferred mode of making the same.

Referring now to Figs. 1, 2, 3, and 4, the screen 1 comprises a relatively thin piece of clear glass as nearly plane on its surfaces and having its surfaces as nearly parallel as may be procured, for instance, by selection from such glass as is in common use for lantern slides and small photographic plates. The thickness of the screen 1 may be selected roughly in accordance with the focal length of the camera or projector with which it is to be used; for a small camera such as a motion picture camera, for instance, having focal distances of about fifty millimeters, the screen should be in the neighborhood of about a millimeter or less in thickness, but a thicker screen can be used for hand cameras, and a still thicker screen used for the larger cameras employed for landscape and portrait photography, if desired.

In the center of the screen a plane parallel spot 2, which may be longer laterally than it is vertically, is arranged to occupy about 4° in the height and 6° in the width of the cone of image bearing rays from the lens L with which the screen is to be used. It will be understood that these proportions are not exact, and that they can be modified within limitations by moving the screen, see Fig. 5, nearer to or farther away from the lens, but the preferred general position of the screen is nearer the plate P on which the image is formed (or the positive to be projected) than it is to the lens L by which the image is formed, and the separation between the plate P and the screen 1 is that sufficient for purposes presently explained. As indicated in Fig. 5 the screen 1 may be mounted rigidly vertically and laterally with the lens L in order to be adjustable, for instance, by the telescoping slide 3, 4, toward and away from the lens, and thus be adapted to be moved with the lens in respect to the plate or film P, in order to shift the position of the plane parallel portion 2 of the screen in respect to the plate, without shifting portion 2 away from the optical axis of the lens.

Proceeding in any radial direction from the center 2, the screen 1 is provided with a polished, irregularly undulating surface 12, deviating, as the center is proceeded away from, more and more from the plane 10 of that surface of the screen 1, so that the individual slopes of the undulations of the surface are at greater and greater angles with respect to the unaltered plane 11 of the lower side of the screen 1. Considering this formation as a system of waves rendered fixed, the effect desired may comprise a gradual lessening of the wave lengths, the amplitude remaining the same; or a gradual increase in amplitude, the wave length remaining the same, or both, the assumed propagative direction of the waved surface being radial from the center. In fact, the virtual waves are not simple, but comprise complex undulative surfaces, of which the average angular deviation increases proportionally to the radial distance from the center.

The undulations or irregularities of the surface are indicated at 12 in Figs. 1, 2 and 4, but it will be understood that the drawings are greatly exaggerated in their vertical dimension.

The purpose and effect of the undulations 12 is best indicated in Figs. 4 and 5. They serve to cause refractive deviations, and are in the nature of minute prisms or lenses, having an exceedingly small refractive effect, but nevertheless serving to bend the rays converging from the margins of the aperture of the lens L to a focus at the plate P differently in respect to each intercept of the screen with any such cone of rays, so that light otherwise proceeding to a focus on the plate P will not be focused, but will be variously refracted, to an extent depending upon the magnitude of the departure from plane parallel surfaces of the portion of the screen intercepted by the particular cone in question. As mentioned, the effective angle and therefore deviation of the prismatic or lenticular surface of the screen 11, if we consider any integral unit of this screen, will vary in proportion to its distance from the plane parallel center 2. The optics of the screen 2 will be understood from Figs. 4 and 5, and from Fig. 3, which illustrates, greatly magnified, an area near one of the margins when viewed against an evenly illuminated background. The darker spots in Fig. 3 represent light distributed away from the line of view of the screen and the lighter spots represent light gathered into the line of view.

In order to be effective, the angular deviation away from focusing position of the rays of light coming from the lens L must have a maximum corresponding to the intended diffusion of the image and no more. Otherwise light at the margins of the plate P would be lost by being distributed out of the image; otherwise, no matter how small the recurring dimensions of the prisms and lenses of the screen surface 12, there will be insufficient regularity in the blurring of the images to provide an even illumination roughly corresponding to the values of the surface of the picture, and the picture will be mottled, which is not desired. What is desired is to diffuse the images, especially the images of edges between light and dark portions of the picture, so as to make such edges about twenty to forty times wider than they will be in the center of the picture opposite the spot 2.

We make screens having these effects by the following preferred method:

Referring now to Fig. 7 a piece of selected nearly plane and nearly parallel glass (correct plane and parallel glass being of course more desirable but unnecessarily expensive) is protected on the back surface 11, and at the margins at 16 and the center at 17, by covering with a thin coat of bituminous varnish, such as any etcher's ground, and placed in a bath 15. The surfaces of the glass plate 1 should be chemically clean. The bath is now filled with an aqueous solution of hydrofluoric acid, preferably comprising about equal portions of commercial hydrofluoric acid of normal strength and distilled water. The operator after about five minutes, more or less, lays in contact with the spot 17 an air-inflated rubber ball 18 which may be fastened on the under side of a handle or arm 19 to enable it to be manipulated more easily, and then presses downward in the direction of the arrow A slowly and steadily, at such a rate that at the end of about ten to twenty minutes (more or less, depending upon the strength of the acid, the chemical composition of the glass, and other factors) the rubber ball will have expanded to and beyond the dotted line position shown in Fig. 7. This motion may be the effect of a screw or a cam driven by hand or mechanically timed mechanism, but making the screens by hand is practicable. As the ball 18 expands, the acid on the upper surface on the plate 1 is reduced to an exceedingly thin film, and in the described way this expulsion of the acid from the surface 12 proceeds radially outward from the center of the screen. When the ball has reached the margins of the plate (it is not necessary that it should reach the corners) the ball is suddenly removed and the plate 1 is quickly dropped into a large quantity of water, washed in clean water, and the etcher's ground at 16 and 17 and on the back of the plate removed.

The result is now not, as might be expected, a plate having a frosted surface. We find that as so treated, the upper surface of the plate has the desired undulations 12 which remain polished. We attribute this to the described way of stopping the action of the acid, by reducing it to a thin film, which is soon exhausted by chemical combination with the glass and leaves the etched surface in the irregular but smooth state characteristic of the wet surfaces of glass while under solution in the acid. Whatever the cause, the effect is the desired effect. The parts of the screen adjacent to the center 2 are barely affected by the acid; the outlying parts are considerably affected. The longer the acid is allowed to act (i. e. the slower the forcing downward of the compressed ball 18) the more refractive will be the outer surfaces of the glass.

The screen is now completed by local grinding and polishing of the spot 2 to remove the linear margin always found around the etcher's ground resist at 17.

We claim:

1. An image modifier screen having a central clear spot not adapted to irregularly refract incident light, and a surrounding region containing refractive surfaces irregularly oriented in all directions, the said screen having an increasing refractive effect toward the margin of the screen.

2. A glass image modifier screen having a central clear spot not adapted to irregularly refract incident light, and having on one surface a surrounding region containing etched refractive surfaces oriented in all directions, the said screen having an increasing refractive effect toward the margin of the screen.

3. A transparent sheet having a polished surface substantially parallel with the other surface in one spot, and repeatedly, progressively and irregularly deviating from parallel in every direction as said spot is departed from.

4. A modifier for use with image formers for the purpose of diffusing the image in varying degrees in accordance with angular departure from the axial region of the image consisting of a substantially plane parallel glass screen having unchanged surfaces at and near a portion through which the axial region of the image is to be formed, and having an etched surface increasingly affected by the etching in concentric regions, in accordance with the several diameters of said regions.

5. The combination with an image-forming lens and an image receiving screen of a transparent refractive image modifier having an ineffective axial region and outlying regions of irregular undulation placed in the image-bearing light nearer to the receiving screen than to the image-forming lens.

Signed by us at Hanover, N. H., this sixteenth day of June, 1922.

ADELBERT AMES, Jr.
CHAS. A. PROCTOR.